United States Patent
Wang

(10) Patent No.: US 10,425,188 B2
(45) Date of Patent: Sep. 24, 2019

(54) INFORMATION TRANSMISSION METHOD, DEVICE, AND SYSTEM

(71) Applicant: Huawei Technologies Co., Ltd., Shenzhen, Guangdong (CN)

(72) Inventor: Jian Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/563,466

(22) PCT Filed: Mar. 31, 2015

(86) PCT No.: PCT/CN2015/075574
§ 371 (c)(1),
(2) Date: Sep. 29, 2017

(87) PCT Pub. No.: WO2016/154914
PCT Pub. Date: Oct. 6, 2016

(65) Prior Publication Data
US 2018/0069657 A1    Mar. 8, 2018

(51) Int. Cl.
*H04L 1/00*        (2006.01)
*H04W 76/14*       (2018.01)
(Continued)

(52) U.S. Cl.
CPC .......... *H04L 1/0045* (2013.01); *H04L 1/0061* (2013.01); *H04W 40/22* (2013.01); *H04W 76/14* (2018.02); *H04W 84/18* (2013.01)

(58) Field of Classification Search
CPC .... H04L 1/0045; H04L 1/0061; H04W 76/14; H04W 40/22; H04W 84/18
See application file for complete search history.

(56) References Cited

U.S. PATENT DOCUMENTS

2011/0170480 A1   7/2011   Pi et al.
2014/0185487 A1   7/2014   Cho et al.
(Continued)

FOREIGN PATENT DOCUMENTS

CN    103581877 A    2/2014
CN    103596241 A    2/2014
(Continued)

OTHER PUBLICATIONS

Intel; "Solution for ProSe UE-to-UE Relay (stateless forwarding)"; SA WG2 Meeting #107; S2-150374; Sorrento, Italy; Jan. 26-31, 2015; 3 pages.
(Continued)

*Primary Examiner* — Kyle Vallecillo
(74) *Attorney, Agent, or Firm* — Fish & Richardson P.C.

(57) ABSTRACT

Embodiments of the present invention relate to the communications field, and provide an information transmission method, a device, and a system, so that relay UE can distinguish received data, so as to implement normal D2D communication. The method includes: receiving, by a transmission device, at least one piece of first information; determining, by the transmission device, an information attribute of corresponding information of each of the at least one piece of first information; and determining, by the transmission device, second information according to the information attribute of the corresponding information of each of the at least one piece of first information. The embodiments of the present invention are used for device to device D2D communication.

16 Claims, 7 Drawing Sheets

(51) Int. Cl.
*H04W 40/22* (2009.01)
*H04W 84/18* (2009.01)

(56) References Cited

U.S. PATENT DOCUMENTS

| | | | |
|---|---|---|---|
| 2015/0264588 A1* | 9/2015 | Li | H04W 56/0015 370/350 |
| 2015/0334757 A1 | 11/2015 | Seo | |
| 2016/0174179 A1* | 6/2016 | Seo | H04W 56/0015 370/350 |
| 2017/0126306 A1* | 5/2017 | Kim | H04W 76/14 |
| 2017/0163470 A1* | 6/2017 | Seo | H04W 76/14 |
| 2017/0171874 A1* | 6/2017 | Kim | H04W 28/02 |
| 2017/0244469 A1* | 8/2017 | Seo | H04W 68/02 |
| 2017/0359835 A1* | 12/2017 | Seo | H04B 7/14 |
| 2018/0007529 A1* | 1/2018 | Shin | H04J 11/00 |
| 2018/0054253 A1* | 2/2018 | Seo | H04B 17/318 |

FOREIGN PATENT DOCUMENTS

| | | |
|---|---|---|
| CN | 103607750 A | 2/2014 |
| EP | 2824848 A1 | 1/2015 |
| JP | 2006287476 A | 10/2006 |
| JP | 2008219409 A | 9/2008 |
| WO | 2013111104 A1 | 8/2013 |
| WO | 2013131234 A1 | 9/2013 |
| WO | 2014104627 A1 | 7/2014 |

OTHER PUBLICATIONS

LG Electronics et al.; "Forwarding of ProSe Group Communications by Stateless ProSe UE-UE Relay" SA WG2 Meeting #107; S2-150692; Sorrento, Italy; Jan. 26-31, 2015; 3 pages.

"3rd Generation Partnership Project; Technical Specification Group Services and System Aspects; Feasiblity Study for Proximity Services (ProSe) (Release 12)"; 3GPP TR 22.803 V12.2.0; Jun. 2013; 45 pages.

Qualcomm Incorporated, "Remaining issues for D2D", 3GPP TSG-RAN WG1 #79, Nov. 17-21, 2014, San Francisco, USA, 3 pages, R1-145060.

Office Action issued in Chinese Application No. 201580066642.4 dated May 7. 2019, 8 pages.

* cited by examiner

INFORMATION TRANSMISSION METHOD, DEVICE, AND SYSTEM

CROSS REFERENCE TO RELATED APPLICATIONS

The present application claims priority under 35 U.S.C. § 365 to International Patent Application No. PCT/CN2015/075574 filed Mar. 31, 2015, which is incorporated herein by reference into the present disclosure as if fully set forth herein.

TECHNICAL FIELD

The present invention relates to the communications field, and in particular, to an information transmission method, a device, and a system.

BACKGROUND

A user equipment to user equipment proximity service (English full name: Device to Device Proximity Service, D2D ProSe for short) has become a research subject of a 3GPP (English full name: 3rd Generation Partnership Project, Chinese: 3rd Generation Partnership Project) LTE (English full name: Long Term Evolution, Chinese: Long Term Evolution) system Rel. 12 (English full name: Release 12, Chinese: Release 12) system. When a physical layer (the physical layer is based on OFDM-MIMO, English full name: Orthogonal Frequency Division Multiplexing-Multiple-Input Multiple-Output, Chinese: Orthogonal Frequency Division Multiplexing-Multiple-Input Multiple-Output) of an LTE system is used to provide a user equipment to user equipment direct communication service, not only a service range of the LTE system is expanded, but also user equipment to user equipment D2D communication may be used by more users.

In an LTE D2D ProSe service, an application scenario is that UE is used to transfer data of another UE by using a UE to UE relay method, so as to increase a transmission distance.

In an LTE D2D system, when sending a D2D signal, UE needs to send scheduling signaling in an SA (English full name: scheduling assignment, Chinese: scheduling assignment) resource, and then send a corresponding D2D signal in a data resource pool. When a D2D terminal sends scheduling signaling in the SA resource, the scheduling signaling includes a destination address of a signal to be sent.

Referring to FIG. 1, FIG. 1 shows an LTE D2D system. An LTE base station and four UEs are shown in the system. If UE 1 needs to send a D2D signal, the UE 1 needs to send scheduling signaling in a corresponding SA resource, and send a corresponding data signal in a data resource pool matching the SA resource. The scheduling signaling sent by the UE 1 in the SA resource includes a destination address. Assuming that the UE 1 needs to communicate with UE 3, in this case, the destination address is an address of the UE 3.

If UE 2 is used to relay data sent by the UE 1, the UE 2 first needs to receive the data before the UE 2 sends the data. A delay occurs when the UE 2 relays a signal of the UE 1. In addition, when relaying the data sent by the UE 1, the UE 2 first also needs to send scheduling signaling in the SA resource, and then sends, in the data resource pool matching the SA resource, the signal that needs to be relayed.

When relaying data of the UE 1, the UE 2 also needs to send scheduling signaling in the SA resource, and the destination address in the scheduling signaling is also the address of the UE 3. If at this time the UE 1 needs to send another piece of data, the UE 1 needs to send another piece of scheduling signaling in the SA resource, and the destination address in the another piece of scheduling signaling is also the address of the UE 3. In this case, for UE x in FIG. 1, if the UE x participates in relaying of the another piece of data, the destination addresses of the two pieces of scheduling signaling received by the UE x in the SA resource are both the address of the UE 3. The UE x cannot determine a time sequence relationship between the two pieces of data sent by the UE 1, and therefore cannot distinguish the two pieces of data. Consequently, D2D communication cannot be normally performed.

SUMMARY

Embodiments of the present invention relate to the communications field, and provide an information transmission method, a device, and a system, so that relay UE can distinguish received information, so as to implement normal D2D communication.

To achieve the foregoing objective, the following technical solutions are used in the embodiments of the present invention:

According to a first aspect, an information transmission method is provided, used for device to device D2D communication, and including:

receiving, by a transmission device, at least one piece of first information;

determining, by the transmission device, an information attribute of corresponding information of each of the at least one piece of first information; and determining, by the transmission device, second information according to the information attribute of the corresponding information of each of the at least one piece of first information.

With reference to the first aspect, in a first possible implementation, the method further includes:

sending, by the transmission device, the second information.

With reference to the first aspect, in a second possible implementation, the information attribute includes one or more of a transmission layer, a priority, or a source, where the transmission layer is used to indicate a quantity of times the corresponding information of the first information is forwarded before the corresponding information of the first information is forwarded to the transmission device, the priority is used to indicate a priority at which the corresponding information of the first information is processed, and the source is used to indicate a source of a sending device sending the corresponding information of the first information.

With reference to the first aspect, in a third possible implementation, the source includes that the sending device is located inside a cell coverage area, or the sending device is located outside a cell coverage area.

With reference to the first aspect, in a fourth possible implementation, the first information is D2D data, and the second information is relay D2D data; and the determining, by the transmission device, second information according to the information attribute of the corresponding information of each of the at least one piece of first information includes:

determining, by the transmission device, the relay D2D data in at least one piece of D2D data according to an information attribute of each of the at least one piece of D2D data; or the first information is first D2D data scheduling assignment SA signaling, and the second information is relay D2D data; and the determining, by the transmission device, second information according to the information attribute of the corresponding information of each of the at least one piece of first information includes:

determining, by the transmission device, second D2D data scheduling assignment SA signaling according to an information attribute of corresponding D2D data of each of at least one piece of first D2D data scheduling assignment SA signaling, and determining the relay D2D data according to the second D2D data scheduling assignment SA signaling; or the first information is a D2D discovery signal, and the second information is a relay D2D discovery signal; and the determining, by the transmission device, second information according to the information attribute of the corresponding information of each of the at least one piece of first information includes:

determining, by the transmission device, the relay D2D discovery signal in at least one D2D discovery signal according to an information attribute of each of the at least one D2D discovery signal.

With reference to the first aspect, in a fifth possible implementation, the determining, by the transmission device, an information attribute of corresponding information of each of the at least one piece of first information includes:

obtaining, by the transmission device, the information attribute of the corresponding information of each piece of first information according to a redundancy parity bit CRC of each of the at least one piece of first information, where a mask of the CRC is used to indicate the information attribute.

With reference to the fifth possible implementation of the first aspect, in a sixth possible implementation, the first information includes at least two code segments; and the obtaining, by the transmission device, the information attribute according to a redundancy parity bit CRC of each of the at least one piece of first information includes:

obtaining, by the transmission device, masks of at least two CRCs according to CRCs of the at least two code segments, where each code segment corresponds to one CRC, and the masks of the at least two CRCs are used to indicate the information attribute of the corresponding information of the first information.

With reference to the fifth or sixth possible implementation of the first aspect, in a seventh possible implementation, there is a preset Hamming distance between the masks of the CRCs.

With reference to the seventh possible implementation of the first aspect, in an eighth possible implementation, the masks of the CRCs include at least one of the following forms: 0000 0000 0000 0000 0000 0000, 1111 1111 1111 1111 1111 1111, 1010 1010 1010 1010 1010 1010, 0101 0101 0101 0101 0101, 1100 1100 1100 1100 1100 1100, 0011 0011 0011 0011 0011 0011, 1111 0000 1111 0000 1111 0000, or 0000 1111 0000 1111 0000 1111.

With reference to the first possible implementation of the first aspect, in a ninth possible implementation, before the sending, by the transmission device, the second information, the method further includes:

updating, by the transmission device, an information attribute of the second information.

According to a second aspect, an information transmission method is provided, used for device to device proximity service D2D communication, and including:

sending, by the sending device, first information, where the first information includes an information attribute of corresponding information of the first information, so that a transmission device receiving the first information determines second information according to the information attribute of the corresponding information of the first information.

With reference to the second aspect, in a first possible implementation, before the sending, by the sending device, first information, the method further includes: configuring, by the sending device, the information attribute of the corresponding information of the first information in the first information, where the information attribute includes one or more of a transmission layer, a priority, or a source, where the transmission layer is used to indicate a quantity of times the corresponding information of the first information is forwarded before the corresponding information of the first information is forwarded to the transmission device, the priority is used to indicate a priority at which the corresponding information of the first information is processed, and the source is used to indicate a source of the sending device sending the corresponding information of the first information.

With reference to the second aspect, in a second possible implementation, the first information includes one or more of D2D data, D2D data scheduling assignment SA signaling, or a D2D discovery signal.

With reference to the first possible implementation of the second aspect, in a third possible implementation, the source includes that the sending device is located inside a cell coverage area, or the sending device is located outside a cell coverage area.

With reference to the second possible implementation of the second aspect, in a fourth possible implementation, the configuring, by the sending device, the information attribute of the corresponding information of the first information in the first information includes:

configuring, by the sending device, a mask of a CRC for a CRC of the first information, where the mask of the CRC is used to indicate the information attribute of the corresponding information of the first information.

With reference to the fourth possible implementation of the second aspect, in a fifth possible implementation, the first information includes at least two code segments; and the configuring, by the sending device, a mask of a CRC for a CRC of the first information includes: configuring, by the sending device, a mask of a CRC for each data code segment of the first information, where the masks of the at least two CRCs are used to indicate the information attribute of the corresponding information of the first information.

With reference to the fourth or fifth possible implementation of the second aspect, in a sixth possible implementation, there is a preset Hamming distance between the masks of the CRCs.

With reference to the sixth possible implementation of the second aspect, in a seventh possible implementation, the masks of the CRCs include at least one of the following forms: 0000 0000 0000 0000 0000 0000, 1111 1111 1111 1111 1111 1111, 1010 1010 1010 1010 1010 1010, 0101 0101 0101 0101 0101 0101, 1100 1100 1100 1100 1100

1100, 0011 0011 0011 0011 0011 0011, 1111 0000 1111 0000 1111 0000, or 0000 1111 0000 1111 0000 1111.

According to a third aspect, a transmission device is provided, used for device to device proximity service D2D communication, and including:

a receiving unit, configured to receive at least one piece of first information; and a processing unit, configured to determine an information attribute of corresponding information of each of the at least one piece of first information received by the receiving unit, where the processing unit is further configured to determine second information according to the information attribute of the corresponding information of each of the at least one piece of first information.

With reference to the third aspect, in a first possible implementation, the transmission device further includes a sending unit, configured to send the second information determined by the processing unit.

With reference to the third aspect, in a second possible implementation, the information attribute includes one or more of a transmission layer, a priority, or a source, where the transmission layer is used to indicate a quantity of times the corresponding information of the first information is forwarded before the corresponding information of the first information is forwarded to the transmission device, the priority is used to indicate a priority at which the corresponding information of the first information is processed, and the source is used to indicate a source of a sending device sending the corresponding information of the first information.

With reference to the third aspect, in a third possible implementation, the source includes that the sending device is located inside a cell coverage area, or the sending device is located outside a cell coverage area.

With reference to the third aspect, in a fourth possible implementation, the first information is D2D data, and the second information is relay D2D data; and the processing unit is specifically configured to determine the relay D2D data in at least one piece of D2D data according to an information attribute of each of the at least one piece of D2D data; or the first information is first D2D data scheduling assignment SA signaling, and the second information is relay D2D data; and the processing unit is specifically configured to: determine second D2D data scheduling assignment SA signaling according to an information attribute of corresponding D2D data of each of at least one piece of first D2D data scheduling assignment SA signaling, and determine the relay D2D data according to the second D2D data scheduling assignment SA signaling; or the first information is a D2D discovery signal, and the second information is a relay D2D discovery signal; and the processing unit is specifically configured to determine the relay D2D discovery signal in at least one D2D discovery signal according to an information attribute of each of the at least one D2D discovery signal.

With reference to the third aspect, in a fifth possible implementation, the processing unit is specifically configured to obtain the information attribute of the corresponding information of each piece of first information according to a redundancy parity bit CRC of each of the at least one piece of first information, where a mask of the CRC is used to indicate the information attribute.

With reference to the fifth possible implementation of the third aspect, in a sixth possible implementation, the first information includes at least two code segments; and the processing unit is specifically configured to obtain masks of at least two CRCs according to CRCs of the at least two code segments, where each code segment corresponds to one CRC, and the masks of the at least two CRCs are used to indicate the information attribute of the corresponding information of the first information.

With reference to the fifth or sixth possible implementation of the third aspect, in a seventh possible implementation, there is a preset Hamming distance between the masks of the CRCs.

With reference to the seventh possible implementation of the third aspect, in an eighth possible implementation, the masks of the CRCs include at least one of the following forms: 0000 0000 0000 0000 0000 0000, 1111 1111 1111 1111 1111 1111, 1010 1010 1010 1010 1010 1010, 0101 0101 0101 0101 0101 0101, 1100 1100 1100 1100 1100 1100, 0011 0011 0011 0011 0011 0011, 1111 0000 1111 0000 1111 0000, or 0000 1111 0000 1111 0000 1111.

With reference to the first possible implementation of the third aspect, in a ninth possible implementation, the processing unit is further configured to update an information attribute of the second information.

According to a fourth aspect, a sending device is provided, used for device to device proximity service D2D communication, and including:

a sending unit, configured to send first information, where the first information includes an information attribute of corresponding information of the first information, so that a transmission device receiving the first information determines second information according to the information attribute of the corresponding information of the first information.

With reference to the fourth aspect, in a second possible implementation, the sending device further includes a processing unit, configured to configure the information attribute of the corresponding information of the first information in the first information sent by the sending unit, where the information attribute includes one or more of a transmission layer, a priority, or a source, where the transmission layer is used to indicate a quantity of times the corresponding information of the first information is forwarded before the corresponding information of the first information is forwarded to the transmission device, the priority is used to indicate a priority at which the corresponding information of the first information is processed, and the source is used to indicate a source of the sending device sending the corresponding information of the first information.

With reference to the first possible implementation of the fourth aspect, in a third possible implementation, the first information includes one or more of D2D data, D2D data scheduling assignment SA signaling, or a D2D discovery signal.

With reference to the first possible implementation of the fourth aspect, in a fourth possible implementation, the source includes that the sending device is located inside a cell coverage area, or the sending device is located outside a cell coverage area.

With reference to the fourth possible implementation of the fourth aspect, in a fifth possible implementation, the processing unit is specifically configured to configure a mask of a CRC for a CRC of the first information, where the mask of the CRC is used to indicate the information attribute of the corresponding information of the first information.

With reference to the fourth possible implementation of the fourth aspect, in a fifth possible implementation, the first information includes at least two code segments; and the first information includes at least two code segments; and the processing unit is specifically configured to configure a mask of a CRC for each code segment of the first information, where the masks of the at least two CRCs are used to indicate the information attribute of the corresponding information of the first information.

With reference to the fourth or fifth possible implementation of the fourth aspect, in a sixth possible implementation, there is a preset Hamming distance between the masks of the CRCs.

With reference to the sixth possible implementation of the fourth aspect, in a seventh possible implementation, the masks of the CRCs include at least one of the following forms: 0000 0000 0000 0000 0000 0000, 1111 1111 1111 1111 1111 1111, 1010 1010 1010 1010 1010 1010, 0101 0101 0101 0101 0101 0101, 1100 1100 1100 1100 1100 1100, 0011 0011 0011 0011 0011 0011, 1111 0000 1111 0000 1111 0000, or 0000 1111 0000 1111 0000 1111.

According to a fifth aspect, a transmission device is provided, used for device to device proximity service D2D communication, and including: a processor, a first interface circuit, a memory, and a bus, where the processor, the first interface circuit, and the memory are connected to each other and communicate with each other by using the bus;

the first interface circuit is configured to receive at least one piece of first information; and the processor is configured to determine an information attribute of corresponding information of each of the at least one piece of first information received by the first interface circuit, where the processor is further configured to determine second information according to the information attribute of the corresponding information of each of the at least one piece of first information.

With reference to the fifth aspect, in a first possible implementation, the transmission device further includes a second interface circuit, configured to send the second information determined by the processor.

With reference to the fifth aspect, in a second possible implementation, the information attribute includes one or more of a transmission layer, a priority, or a source, where the transmission layer is used to indicate a quantity of times the corresponding information of the first information is forwarded before the corresponding information of the first information is forwarded to the transmission device, the priority is used to indicate a priority at which the corresponding information of the first information is processed, and the source is used to indicate a source of a sending device sending the corresponding information of the first information.

With reference to the fifth aspect, in a third possible implementation, the source includes that the sending device is located inside a cell coverage area, or the sending device is located outside a cell coverage area.

With reference to the fifth aspect, in a fourth possible implementation, the first information is D2D data, and the second information is relay D2D data; and the processor is specifically configured to determine the relay D2D data in at least one piece of D2D data according to an information attribute of each of the at least one piece of D2D data; or the first information is first D2D data scheduling assignment SA signaling, and the second information is relay D2D data; and the processor is specifically configured to: determine second D2D data scheduling assignment SA signaling according to an information attribute of corresponding D2D data of each of at least one piece of first D2D data scheduling assignment SA signaling, and determine the relay D2D data according to the second D2D data scheduling assignment SA signaling; or the first information is a D2D discovery signal, and the second information is a relay D2D discovery signal; and the processor is specifically configured to determine the relay D2D discovery signal in at least one D2D discovery signal according to an information attribute of each of the at least one D2D discovery signal.

With reference to the fifth aspect, in a fifth possible implementation, the processor is specifically configured to obtain the information attribute of the corresponding information of each piece of first information according to a redundancy parity bit CRC of each of the at least one piece of first information, where a mask of the CRC is used to indicate the information attribute.

With reference to the fifth possible implementation of the fifth aspect, in a sixth possible implementation, the first information includes at least two code segments; and the processor is specifically configured to obtain masks of at least two CRCs according to CRCs of the at least two code segments, where each code segment corresponds to one CRC, and the masks of at least two CRCs are used to indicate the information attribute of the corresponding information of the first information.

With reference to the fifth or sixth possible implementation of the fifth aspect, in a seventh possible implementation, there is a preset Hamming distance between the masks of the CRCs.

With reference to the seventh possible implementation of the fifth aspect, in an eighth possible implementation, the masks of the CRCs include at least one of the following forms: 0000 0000 0000 0000 0000 0000, 1111 1111 1111 1111 1111 1111, 1010 1010 1010 1010 1010 1010, 0101 0101 0101 0101 0101 0101, 1100 1100 1100 1100 1100 1100, 0011 0011 0011 0011 0011 0011, 1111 0000 1111 0000 1111 0000, or 0000 1111 0000 1111 0000 1111.

With reference to the first possible implementation of the fifth aspect, in a ninth possible implementation, the processor is further configured to update an information attribute of the second information.

According to a sixth aspect, a sending device is provided, used for device to device proximity service D2D communication, and including: a processor, a first interface circuit, a memory, and a bus, where the processor, the first interface circuit, and the memory are connected to each other and communicate with each other by using the bus; and the first interface circuit is configured to send first information, where the first information includes an information attribute of corresponding information of the first information, so that a transmission device receiving the first information determines second information according to the information attribute of the corresponding information of the first information.

With reference to the sixth aspect, in a second possible implementation, the processor is configured to configure the information attribute of the corresponding information of the first information in the first information sent by the first interface circuit, where the information attribute includes one or more of a transmission layer, a priority, or a source, where the transmission layer is used to indicate a quantity of times the corresponding information of the first information is forwarded before the corresponding information of the first information is forwarded to the transmission device, the priority is used to indicate a priority at which the corresponding information of the first information is processed, and the source is used to indicate a source of the sending device sending the corresponding information of the first information.

With reference to the first possible implementation of the sixth aspect, in a third possible implementation, the first information includes one or more of D2D data, D2D data scheduling assignment SA signaling, or a D2D discovery signal.

With reference to the first possible implementation of the sixth aspect, in a fourth possible implementation, the source includes that the sending device is located inside a cell coverage area, or the sending device is located outside a cell coverage area.

With reference to the fourth possible implementation of the sixth aspect, in a fifth possible implementation, the processor is specifically configured to configure a mask of a CRC for a CRC of the first information, where the mask of the CRC is used to indicate the information attribute of the corresponding information of the first information.

With reference to the fourth possible implementation of the sixth aspect, in a fifth possible implementation, the first information includes at least two code segments; and the processor is specifically configured to configure a mask of a CRC for each code segment of the first information, where the masks of the at least two CRCs are used to indicate the information attribute of the corresponding information of the first information.

With reference to the fourth or fifth possible implementation of the sixth aspect, in a sixth possible implementation, there is a preset Hamming distance between the masks of the CRCs.

With reference to the sixth possible implementation of the sixth aspect, in a seventh possible implementation, the masks of the CRCs include at least one of the following forms: 0000 0000 0000 0000 0000 0000, 1111 1111 1111 1111 1111 1111, 1010 1010 1010 1010 1010 1010, 0101 0101 0101 0101 0101 0101, 1100 1100 1100 1100 1100 1100, 0011 0011 0011 0011 0011 0011, 1111 0000 1111 0000 1111 0000, or 0000 1111 0000 1111 0000 1111.

According to a seventh aspect, a communications system is provided, used for device to device proximity service D2D communication, and including: the transmission device according to the third aspect or any possible implementation of the third aspect and the sending device according to the fourth aspect or any possible implementation of the fourth aspect; or including: the transmission device according to the fifth aspect or any possible implementation of the fifth aspect and the sending device according to the sixth aspect or any possible implementation of the sixth aspect.

According to the information transmission method, the device, and the system that are provided in the embodiments of the present invention, a transmission device can determine, according to an information attribute that is of corresponding information of received first information and that is included in the first information, second information that is relayed, so that relay UE can distinguish received information, so as to implement normal D2D communication.

BRIEF DESCRIPTION OF THE DRAWINGS

To describe the technical solutions in the embodiments of the present invention or the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION

Figure 1:
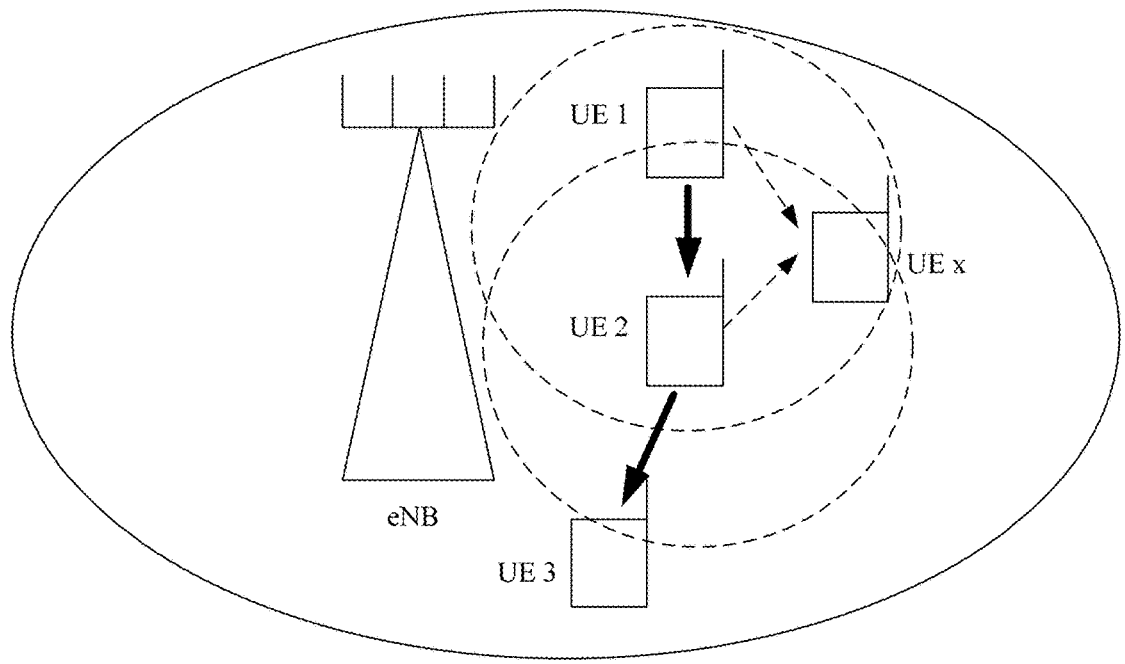
FIG. 1 is a schematic structural diagram of a communications system according to an embodiment of the present invention.

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

It should be understood that, the technical solutions of the embodiments of the present invention may be applied to various communications systems, such as: a Global System of Mobile Communications (English full name: Global System of Mobile communication, GSM for short) system, a Code Division Multiple Access (English full name: Code Division Multiple Access, CDMA for short) system, a Wideband Code Division Multiple Access (English full name: Wideband Code Division Multiple Access, WCDMA for short) system, a general packet radio service (English full name: General Packet Radio Service, GPRS for short), a Long Term Evolution (English full name: Long Term Evolution, LTE for short) system, an LTE frequency division duplex (English full name: Frequency Division Duplex, FDD for short) system, an LTE time division duplex (English full name: Time Division Duplex, TDD for short), a Universal Mobile Telecommunications System (English full name: Universal Mobile Telecommunication System, UMTS for short), a Worldwide Interoperability for Microwave Access (English full name: Worldwide Interoperability for Microwave Access, WiMAX for short) communications system or the like.

The transmission device provided in the embodiments of the present invention is user equipment (English full name: User Equipment, UE for short), and may be a cellular phone, a cordless phone, a Session Initiation Protocol (English full name: Session Initiation Protocol, SIP for short) phone, a wireless local loop (English full name: Wireless Local Loop, WLL for short) station, a personal digital assistant (English full name: Personal Digital Assistant, PDA for short), a handheld device having a wireless communication function, an in-vehicle device, a wearable device, a computing device, or another processing device connected to a wireless modem.

A base station provided in the embodiments of the present invention may be a device that communicates with the user equipment over an air interface in an access network by using one or more sectors. The base station may be configured to mutually convert a received over-the-air frame and an Internet Protocol (English full name: Internet Protocol, IP for short) packet and serve as a router between the user equipment and a rest portion of the access network. The rest portion of the access network may include an IP network. The base station may coordinate attribute management of the air interface. The base station may be a base transceiver station (English full name: Base Transceiver Station, BTS for short) in a Global System for Mobile Communications (English full name: Global System for Mobile communication, GSM for short) or Code Division Multiple Access (English full name: Code Division Multiple Access, CDMA for short), may be a base station (English full name: Base Station, BS for short) in Wideband Code Division Multiple Access (English full name: Wideband Code Division Multiple Access, WCDMA for short), may be an evolved NodeB (English full name: evolutional Node B, NodeB, or eNB, or e-NodeB for short) in Long Term Evolution (English full name: Long Term Evolution, LTE for short), or may be a macro base station and a micro base station in a cellular wireless communications system. This is not limited in the embodiments of the present invention.

Terms "first" and "second" are used only for a purpose of description, and shall not be construed as indicating or implying relative importance or implying a quantity of indicated technical features. Therefore, a feature restricted by "first" or "second" may explicitly indicate or implicitly include one or more such features. In the following embodiments, "first" and "second" are used only for distinguish first information and second information, and the like.

An embodiment of the present invention provides a communications system, used for device to device D2D communication. The system includes at least three UEs. Referring to FIG. 1, FIG. 1 further shows a base station eNB.

Figure 2:
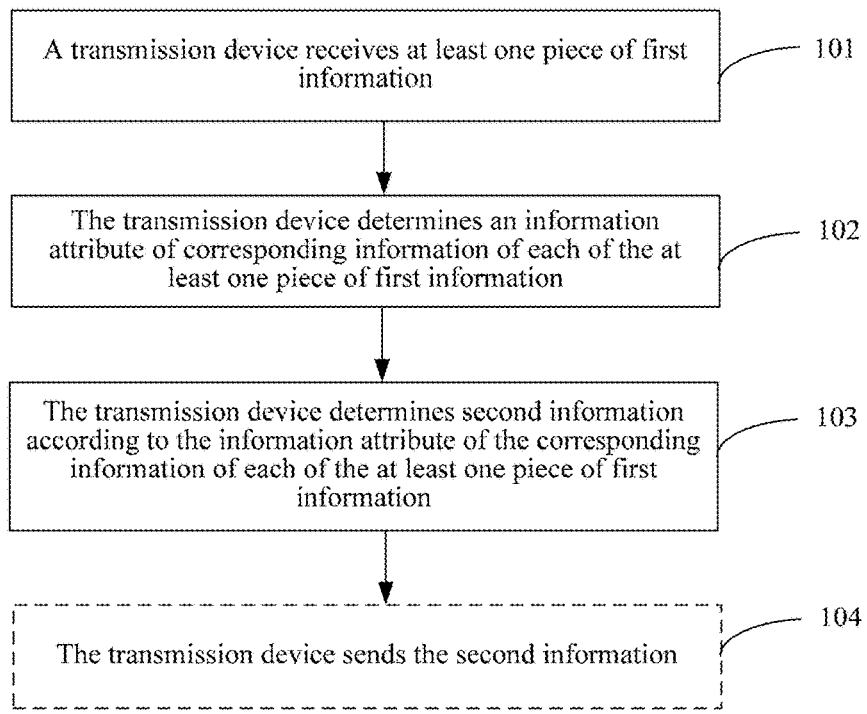
FIG. 2 is a schematic flowchart of an information transmission method according to an embodiment of the present invention.

With reference to the foregoing communications system, an information transmission method is provided and is used for device to device D2D communication. The method is used by the transmission device to receive data. UE 1 has data to send to UE 3. The following method is applicable to UEs other than the UE 1 in the communications system shown in FIG. 1. Referring to FIG. 2, the method includes the following steps.

101: A transmission device receives at least one piece of first information.

Optionally, the first information includes any one of the following: D2D data, D2D data scheduling assignment SA signaling, or a D2D discovery signal.

102: The transmission device determines an information attribute of corresponding information of each of the at least one piece of first information.

Optionally, the information attribute includes one or more of a transmission layer, a priority, or a source. The transmission layer is used to indicate a quantity of times the corresponding information of the first information is forwarded before the corresponding information of the first information is forwarded to the transmission device, the priority is used to indicate a priority at which the corresponding information of the first information is processed, and the source is used to indicate a source of a sending device sending the corresponding information of the first information. Optionally, the source includes that the sending device is located inside a cell coverage area, or the sending device is located outside a cell coverage area. The corresponding information of the first information may be the first information or information indicated by the first information. For example, when the first information is D2D data, the corresponding information of the first information may be one or more pieces of received D2D data. When the first information is D2D data scheduling assignment SA signaling, the corresponding information of the first information may be one or more pieces of D2D data indicated by the D2D data scheduling assignment SA signaling. When the first information is a D2D discovery signal, the corresponding information of the first information may be one or more received D2D discovery signals.

103: The transmission device determines second information according to the information attribute of the corresponding information of each of the at least one piece of first information.

Further, if the transmission device is a last receiving device in D2D communication, the method ends after step 103 is performed. If the transmission device is a relay device, the method further includes step 104.

104: The transmission device sends the second information.

Specifically, step 104 may be sending data to another device according to the information attribute of the second information. In step 104, the information attribute includes one or more of the transmission layer, the priority, or the source of the corresponding information of the first information. The transmission layer is used as an example. It may be understood that each time of forwarding of information has a delay. Assuming that delays of different times of forwarding by the transmission device are the same or close, a higher transmission layer indicates an earlier sending time of information, so that the transmission device forwards the second information according to the transmission layer to optimize information transmission. Similarly, the transmission device may determine the second information according to the priority. When the information attribute is a source, the transmission device may distinguish whether the first information is sent when the sending device is located inside a cell coverage area or is located outside a cell coverage area, and determine and send the second information according to whether the first information is sent when the sending device is located inside a cell coverage area or is located outside a cell coverage area.

According to the information transmission provided in this embodiment of the present invention, a transmission device can determine relayed second information according to an information attribute that is of corresponding information of received first information and that is included in the first information, so that relay UE can distinguish received information, so as to implement normal D2D communication.

Figure 3:
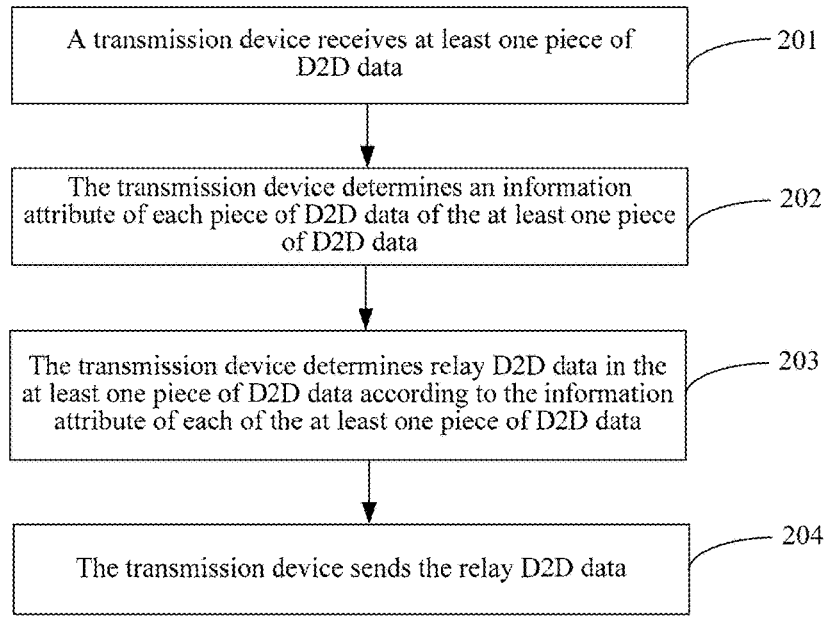
FIG. 3 is a schematic flowchart of an information transmission method according to another embodiment of the present invention.

Specifically, first information is D2D data, and second information is relay D2D data. Referring to FIG. 3, another embodiment of the present invention provides an information transmission method, including the following steps.

201: A transmission device receives at least one piece of D2D data.

202: The transmission device determines an information attribute of each of the at least one piece of D2D data.

The information attribute includes one or more of a transmission layer, a priority, or a source. The transmission layer is used to indicate a quantity of times corresponding information of the first information is forwarded before the corresponding information of the first information is forwarded to the transmission device. The priority is used to indicate a priority at which the corresponding information of the first information is processed. The source is used to indicate a source of a sending device sending the corresponding information of the first information. Optionally, the source includes that the sending device is located inside a cell coverage area, or the sending device is located outside a cell coverage area.

203: The transmission device determines relay D2D data in the at least one piece of D2D data according to the information attribute of each of the at least one piece of D2D data.

Further, if the transmission device is a receiving device, the method ends after step 203 is performed. If the transmission device is a relay device, the method further includes step 204.

204: The transmission device sends the relay D2D data.

According to the information transmission method provided in this embodiment of the present invention, a transmission device can determine relay D2D data in received D2D data according to one or more information attributes of a transmission layer, a priority, or a source included in the received D2D data, so that the transmission device used as relay UE can distinguish between the received D2D data, so as to implement normal D2D communication.

Figure 4:
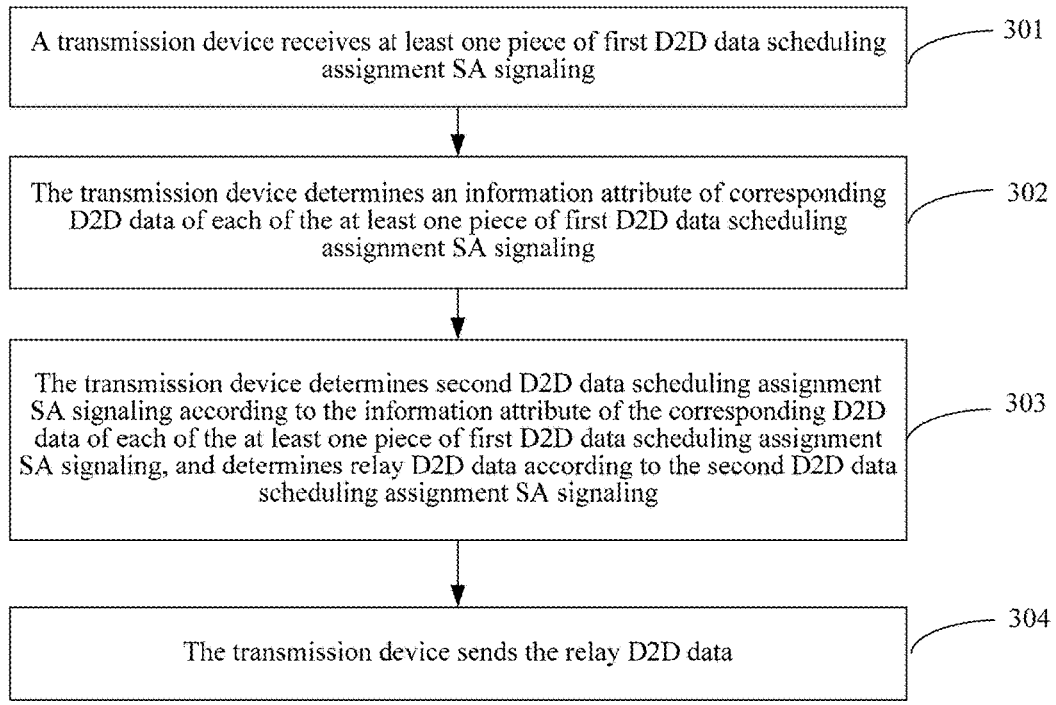
FIG. 4 is a schematic flowchart of an information transmission method according to still another embodiment of the present invention.

Specifically, first information is first D2D data scheduling assignment SA signaling, and second information is relay D2D data. Referring to FIG. 4, another embodiment of the present invention provides an information transmission method, including the following steps.

301: A transmission device receives at least one piece of first D2D data scheduling assignment SA signaling.

302: The transmission device determines an information attribute of corresponding D2D data of each of the at least one piece of first D2D data scheduling assignment SA signaling.

The information attribute includes one or more of a transmission layer, a priority, or a source. The transmission layer is used to indicate a quantity of times corresponding information of the first information is forwarded. The priority is used to indicate a priority at which the corresponding information of the first information is processed. The source is used to indicate a source of a sending device sending the corresponding information of the first information. Optionally, the source includes that the sending device is located inside a cell coverage area, or the sending device is located outside a cell coverage area.

303: The transmission device determines second D2D data scheduling assignment SA signaling according to the information attribute of the corresponding D2D data of each of the at least one piece of first D2D data scheduling assignment SA signaling, and determines relay D2D data according to the second D2D data scheduling assignment SA signaling.

Further, if the transmission device is a receiving device, the method ends after step 303 is performed. If the transmission device is a relay device, the method further includes step 304.

304: The transmission device sends the relay D2D data.

According to the information transmission method provided in this embodiment of the present invention, a transmission device can determine second D2D data scheduling assignment SA signaling corresponding to relay D2D data according to one or more information attributes of a transmission layer, a priority, or a source included in received first D2D data scheduling assignment SA signaling, and determine the relay D2D data according to the second D2D data scheduling assignment SA signaling, so that the transmission device used as relay UE can distinguish received D2D data, so as to implement normal D2D communication.

Figure 5:
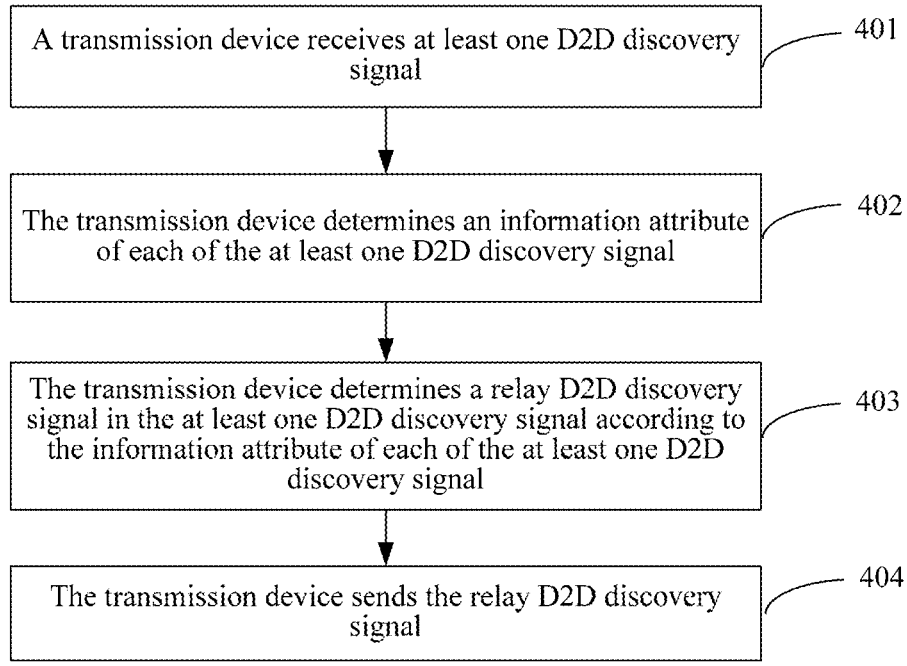
FIG. 5 is a schematic flowchart of an information transmission method according to yet another embodiment of the present invention.

Specifically, first information is a D2D discovery signal, and second information is a relay D2D discovery signal. Referring to FIG. 5, another embodiment of the present invention provides an information transmission method, including the following steps.

401: A transmission device receives at least one D2D discovery signal.

402: The transmission device determines an information attribute of each of the at least one D2D discovery signal.

The information attribute includes one or more of a transmission layer, a priority, or a source. The transmission layer is used to indicate a quantity of times corresponding information of the first information is forwarded before the corresponding information of the first information is forwarded to the transmission device. The priority is used to indicate a priority at which the corresponding information of the first information is processed. The source is used to indicate a source of a sending device sending the corresponding information of the first information. Optionally, the source includes that the sending device is located inside a cell coverage area, or the sending device is located outside a cell coverage area.

403: The transmission device determines a relay D2D discovery signal in the at least one D2D discovery signal according to the information attribute of each of the at least one D2D discovery signal.

Further, if the transmission device is a receiving device, the method ends after step 403 is performed. If the transmission device is a relay device, the method further includes step 404.

404: The transmission device sends the relay D2D discovery signal.

According to the information transmission method provided in this embodiment of the present invention, a transmission device can determine a relay D2D discovery signal in a received D2D discovery signal according to one or more information attributes of a transmission layer, a priority, or a source included in the received D2D discovery signal, so that the transmission device used as relay UE can distinguish received relay D2D discovery signals, so as to implement normal D2D communication.

Figure 6:
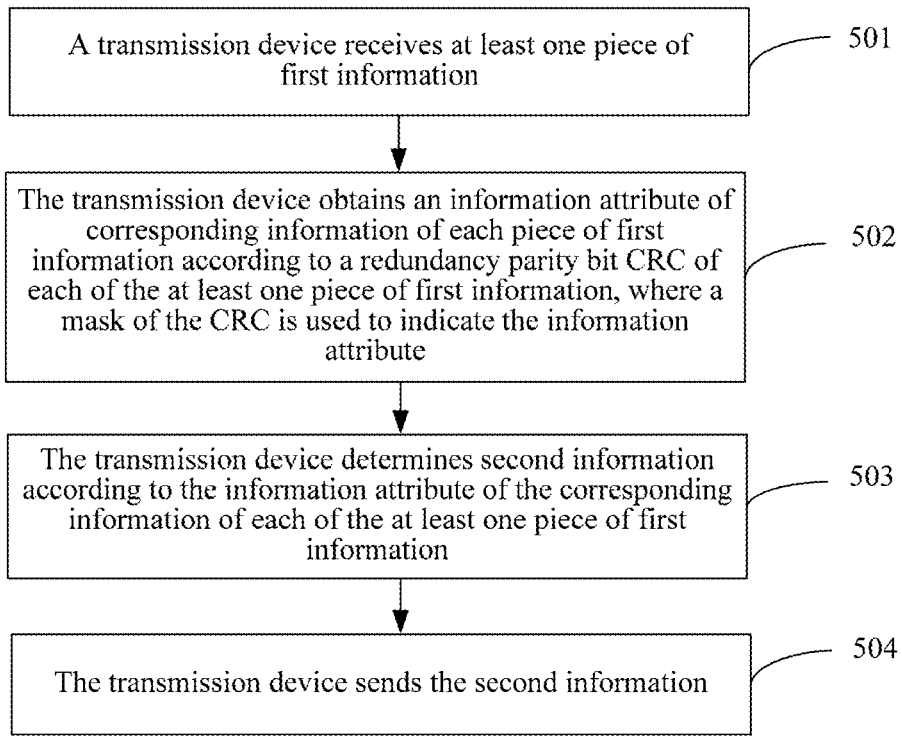
FIG. 6 is a schematic flowchart of an information transmission method according to another embodiment of the present invention.

Referring to FIG. 6, an embodiment of the present invention provides an information transmission method, including:

501: A transmission device receives at least one piece of first information.

Optionally, the first information includes any one of the following: D2D data, D2D data scheduling assignment SA signaling, or a D2D discovery signal.

502: The transmission device obtains an information attribute of corresponding information of each piece of first information according to a redundancy parity bit CRC of each of the at least one piece of first information. A mask of the CRC is used to indicate the information attribute.

The information attribute includes one or more of a transmission layer, a priority, or a source. The transmission layer is used to indicate a quantity of times the corresponding information of the first information is forwarded before the corresponding information of the first information is forwarded to the transmission device. The priority is used to indicate a priority at which the corresponding information of the first information is processed. The source is used to indicate a source of a sending device sending the corresponding information of the first information. Optionally, the source includes that the sending device is located inside a cell coverage area, or the sending device is located outside a cell coverage area. The mask of the CRC included in the CRC is used to indicate the information attribute of the corresponding information of the first information. The mask of the CRC is a mask sequence having a predetermined length, for example, 24 bits. When the first information is D2D data, the CRC is configured on a physical layer of a data structure.

Optionally, there is a preset Hamming (English: Hamming) distance between the masks of the CRCs. The mask of the CRC includes at least one of the following forms: 0000 0000 0000 0000 0000 0000, 1111 1111 1111 1111 1111 1111, 1010 1010 1010 1010 1010 1010, 0101 0101 0101 0101 0101 0101, 1100 1100 1100 1100 1100 1100, 0011 0011 0011 0011 0011, 1111 0000 1111 0000 1111 0000, or 0000 1111 0000 1111 0000 1111.

Figure 7:
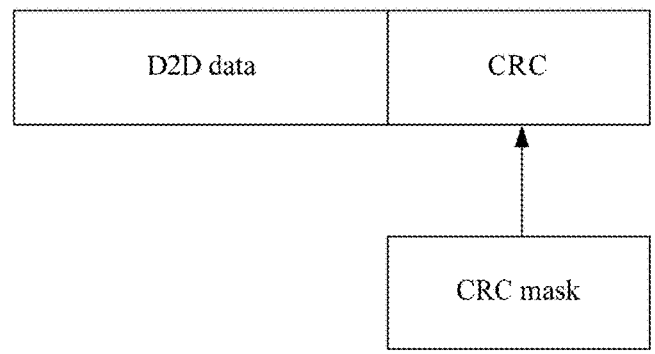
FIG. 7 is a schematic diagram of a data structure according to an embodiment of the present invention.

Specifically, referring to FIG. 7, a data structure is provided, including D2D data and a CRC of the D2D data. In an embodiment of the present invention, the CRC further includes a mask (mask) of the CRC.

As shown in Table 1, a correspondence between a mask sequence of a mask of a CRC and a transmission layer is provided:

TABLE 1

| Transmission layer | Mask sequence |
| --- | --- |
| 0 | 000000000000000000000000 |
| 1 | 111111111111111111111111 |
| 2 | 101010101010101010101010 |
| 3 | 010101010101010101010101 |
| 4 | 110011001100110011001100 |
| 5 | 001100110011001100110011 |
| 6 | 111100001111000011110000 |
| 7 | 000011110000111100001111 |

As shown in Table 2, a correspondence between a mask sequence of a mask of a CRC and a priority is provided:

TABLE 2

| Priority | Mask sequence |
| --- | --- |
| 0 | 000000000000000000000000 |
| 1 | 111111111111111111111111 |
| 2 | 101010101010101010101010 |
| 3 | 010101010101010101010101 |
| 4 | 110011001100110011001100 |
| 5 | 001100110011001100110011 |
| 6 | 111100001111000011110000 |
| 7 | 000011110000111100001111 |

As shown in Table 3, a correspondence between a mask sequence of a mask of a CRC and a source is provided:

TABLE 3

| Source | Mask sequence |
| --- | --- |
| A sending device is located inside a cell coverage area | 000000000000000000000000 |
| A sending device is located outside a cell coverage area | 111111111111111111111111 |

In the foregoing Table 1 to Table 3, there is a preset Hamming distance between the mask sequences. In Table 1, a Hamming distance between mask sequences of a transmission layer 0 and a transmission layer 1 is 24. A minimum Hamming distance between other transmission layers is 12. In Table 2, a Hamming distance between mask sequences of a priority 0 and a priority 1 is 24. A minimum Hamming distance between other priorities is 2. In Table 3, a Hamming distance between mask sequences of two sources is 24. Certainly, the foregoing is merely an example. Solutions of the present invention are not limited to the foregoing manner.

Further, when the first information includes at least two code segments, step 502 is specifically that the transmission device obtains masks of at least two CRCs according to CRCs of the at least two code segments. Each code segment corresponds to one CRC. The masks of the at least two CRCs are used to indicate the information attribute of the corresponding information of the first information.

An example in which the first information is D2D data is used for description. Usually, when sending data, D2D UE needs to add a cyclic redundancy parity bit CRC to a physical layer. When a total quantity of a quantity of bits of the D2D data and a quantity of bits of the CRC is greater than a bit threshold (for example, 6144 bits in an LTE system), the D2D data needs to be segmented. In this case, the D2D data includes at least two code segments. Each code segment includes a corresponding CRC. In this case, an information attribute includes masks of CRCs corresponding to the CRCs of the at least two code segments.

Figure 8:
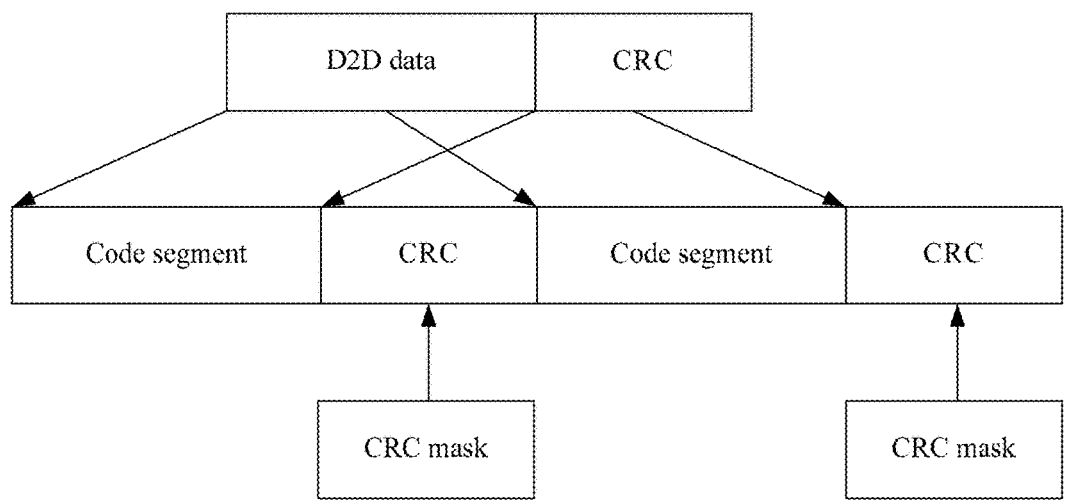
FIG. 8 is a schematic diagram of a data structure according to another embodiment of the present invention.

As shown in FIG. 8, each piece of D2D data includes several code segments (English: code segment). For each code segment, separate CRC check is performed. Therefore, each code segment corresponds to one CRC. Specifically, as shown in FIG. 8, a data structure is provided, including D2D data and a CRC of the D2D data. The D2D data includes at least two code segments of the D2D data. An information attribute includes masks of CRCs corresponding to the CRCs of the at least two code segments. There is a preset Hamming distance between masks of two CRCs. In this case, the information attribute is indicated by using a combination of mask sequences of masks of CRCs corresponding to all code segments.

For example, as shown in FIG. 8, D2D data includes two code segments. Each code segment has a respective CRC. A mask of the CRC is added to the CRC of each code segment. Assuming that the mask of the CRC has N types of mask sequences, mask sequences of the CRCs of the two code segments may indicate in total N^2 information attributes. The symbol ^ represents exponentiation. Certainly, FIG. 8 is merely an example. When each piece of D2D data includes M code segments, mask sequences of CRCs of the M code segments may indicate in total N^M information attributes. For example, if a mask of a CRC has two types of mask sequences, the CRCs of the two code segments may indicate 2^2=4 information attributes. As shown in Table 2, Table 2 shows a correspondence between a mask sequence and a sequence number in a CRC:

TABLE 4

| Sequence number | Mask sequence |
|---|---|
| 0 | 000000000000000000000000 |
| 1 | 111111111111111111111111 |
| 2 | 101010101010101010101010 |
| 3 | 010101010101010101010101 |
| 4 | 110011001100110011001100 |
| 5 | 001100110011001100110011 |
| 6 | 111100001111000011110000 |
| 7 | 000011110000111100001111 |

In Table 4, an interval between the mask sequences is a preset Hamming distance. A Hamming distance between mask sequences of a sequence number 0 and a sequence number 1 in the foregoing table is 24. A minimum Hamming distance between other sequence numbers is 12. Certainly, this is merely an example. Solutions of the present invention are not limited to Table 2.

When the foregoing eight mask sequences are used, for a case of two code segments, in total 8*8=64 information attributes may be indicated. Certainly, if all these information attributes are not needed, some of the eight mask sequences may be selected. When the information attributes are transmission layers, for example, the first two sequences 0 and 1 may indicate in total 2*2=4 transmission layers.

For details, refer to the following examples:

If a sequence number of a mask sequence corresponding to a mask of a CRC of a first code segment is 0, and a sequence number of a mask sequence corresponding to a mask of a CRC of a second code segment is 0, it indicates that a transmission layer is 0.

If a sequence number of a mask sequence corresponding to a mask of a CRC of a first code segment is 0, and a sequence number of a mask sequence corresponding to a mask of a CRC of a second code segment is 1, it indicates that a transmission layer is 1.

If a sequence number of a mask sequence corresponding to a mask of a CRC of a first code segment is 1, and a sequence number of a mask sequence corresponding to a mask of a CRC of a second code segment is 0, it indicates that a transmission layer is 2.

If a sequence number of a mask sequence corresponding to a mask of a CRC of a first code segment is 1, and a sequence number of a mask sequence corresponding to a mask of a CRC of a second code segment is 1, it indicates that a transmission layer is 3. The foregoing merely provides an example. Solutions of the present invention are not limited to the foregoing examples.

When the information attributes are priorities, for example, the first two sequences 0 and 1 may indicate in total 2*2=4 priorities.

For details, refer to the following examples:

If a sequence number of a mask sequence corresponding to a mask of a CRC of a first code segment is 0, and a sequence number of a mask sequence corresponding to a mask of a CRC of a second code segment is 0, it indicates that a priority is 0.

If a sequence number of a mask sequence corresponding to a mask of a CRC of a first code segment is 0, and a sequence number of a mask sequence corresponding to a mask of a CRC of a second code segment is 1, it indicates that a priority is 1.

If a sequence number of a mask sequence corresponding to a mask of a CRC of a first code segment is 1, and a sequence number of a mask sequence corresponding to a mask of a CRC of a second code segment is 0, it indicates that a priority is 2.

If a sequence number of a mask sequence corresponding to a mask of a CRC of a first code segment is 1, and a sequence number of a mask sequence corresponding to a mask of a CRC of a second code segment is 1, it indicates that a priority is 3. The foregoing merely provides some examples. Solutions of the present invention are not limited to the foregoing examples.

When the information attributes are sources, for example, the first two sequences 0 and 1 may further indicate the sources.

For details, refer to the following examples:

If a sequence number of a mask sequence corresponding to a mask of a CRC of a first code segment is 0, and a sequence number of a mask sequence corresponding to a mask of a CRC of a second code segment is 0, it indicates that the sending device is located inside a cell coverage area, or information comes from inside a cell coverage area.

If a sequence number of a mask sequence corresponding to a mask of a CRC of a first code segment is 1, and a sequence number of a mask sequence corresponding to a mask of a CRC of a second code segment is 1, it indicates that the sending device is located outside a cell coverage area, or information comes from outside a cell coverage area. The foregoing merely provides an example. Solutions of the present invention are not limited to the foregoing examples.

503: The transmission device determines second information according to the information attribute of the corresponding information of each of the at least one piece of first information.

Further, if the transmission device is a receiving device, the method ends after step 503 is performed. If the transmission device is a relay device, the method further includes step 504.

504: The transmission device sends the second information.

Optionally, before step 504, the method further includes: updating, by the transmission device, an information attribute of the second information. Step 504 is specifically that the transmission device sends the second information whose information attribute has been updated.

According to the information transmission method provided in this embodiment of the present invention, a transmission device can determine relayed second information according to one or more information attributes of a transmission layer, a priority, or a source included in received first information, so that the transmission device used as relay UE can distinguish received information, so as to implement normal D2D communication.

Figure 9:
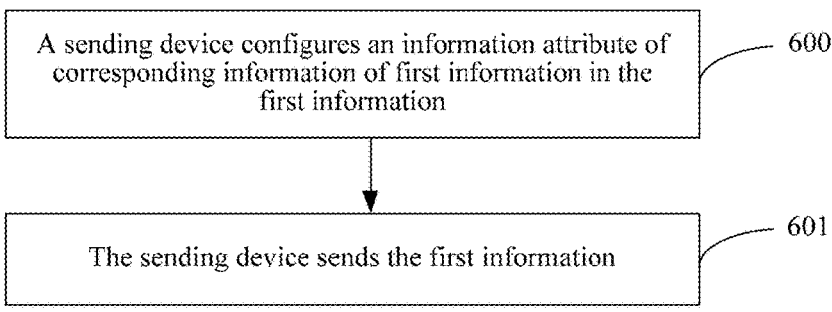
FIG. 9 is a schematic flowchart of an information transmission method according to still another embodiment of the present invention.

An embodiment of the present invention provides an information transmission method, used for a sending device that needs to send data in a relay manner. The sending device is, for example, the UE 1 in the system shown in FIG. 1. Referring to FIG. 9, the method includes the following steps.

601: The sending device sends first information.

The first information includes an information attribute of corresponding information of the first information, so that a transmission device receiving the first information determines second information according to the information attribute of the corresponding information of the first information. Optionally, the information attribute includes one or more of a transmission layer, a priority, or a source. The transmission layer is used to indicate a quantity of times the corresponding information of the first information is forwarded. The priority is used to indicate a priority at which the corresponding information of the first information is processed. The source is used to indicate a source of the sending device sending the corresponding information of the first information. Optionally, the source includes that the sending device is located inside a cell coverage area, or the sending device is located outside a cell coverage area. The first information includes one or more of D2D data, D2D data scheduling assignment SA signaling, or a D2D discovery signal.

Optionally, before step 601, the method further includes the following step:

600: The sending device configures the information attribute of the corresponding information of the first information in the first information.

According to the information transmission method provided in this embodiment of the present invention, a sending device can configure an information attribute of corresponding information of sent first information in the first information, so that a transmission device can determine relayed second information according to the information attribute included in the received first information, and the transmission device used as relay UE can distinguish received information, so as to implement normal D2D communication.

Further, step 601 specifically includes: configuring, by the sending device, a mask of a CRC for the CRC of the first information. The mask of the CRC is used to indicate the information attribute of the corresponding information of the first information.

Optionally, the first information includes at least two code segments. The configuring, by the sending device, a mask of a CRC for the CRC of the first information specifically includes: configuring, by the sending device, a mask of a CRC for each code segment of the first information. The masks of the at least two CRCs are used to indicate the information attribute of the corresponding information of the first information.

Optionally, there is a preset Hamming distance between the masks of the CRCs. The mask of the CRC includes at least one of the following forms: 0000 0000 0000 0000 0000 0000, 1111 1111 1111 1111 1111 1111, 1010 1010 1010 1010 1010 1010, 0101 0101 0101 0101 0101 0101, 1100 1100 1100 1100 1100 1100, 0011 0011 0011 0011 0011 0011, 1111 0000 1111 0000 1111 0000, or 0000 1111 0000 1111 0000 1111. For a specific combination form of mask sequences, refer to the description in the embodiment corresponding to the foregoing Table 1 to Table 4, and details are not described herein again.

Figure 10:
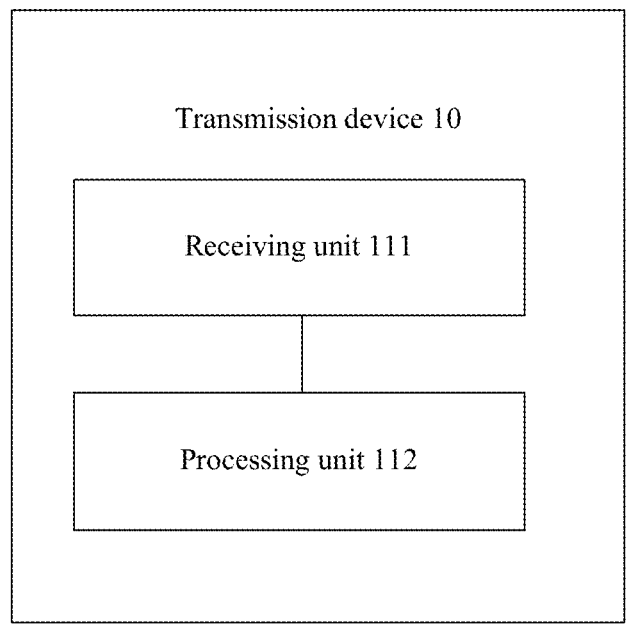
FIG. 10 is a schematic structural diagram of a transmission device according to an embodiment of the present invention.

Referring to FIG. 10, a transmission device 10 is provided, used for device to device proximity service D2D communication, and including:

a receiving unit 111, configured to receive at least one piece of first information; and a processing unit 112, configured to determine an information attribute of corresponding information of each of the at least one piece of first information received by the receiving unit 111.

The processing unit 112 is further configured to determine second information according to the information attribute of the corresponding information of each of the at least one piece of first information.

The transmission device provided in this embodiment of the present invention can determine relayed second information according to an information attribute that is of corresponding information of received first information and that is included in the first information, so that relay UE can distinguish received information, so as to implement normal D2D communication.

Figure 11:
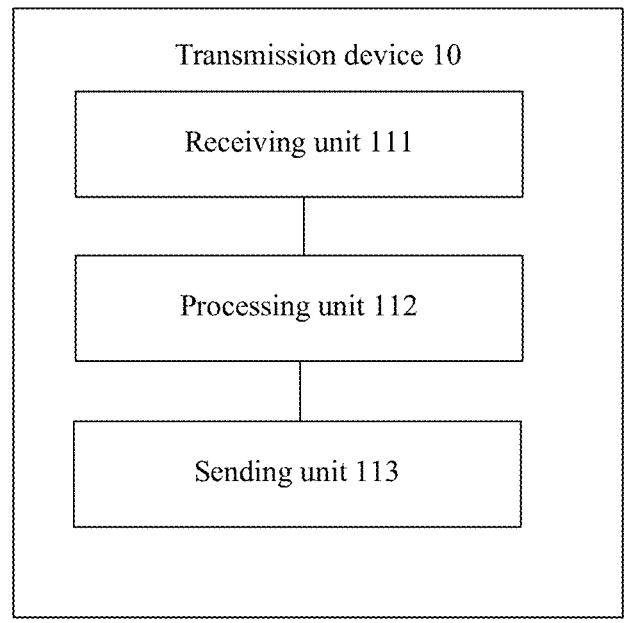
FIG. 11 is a schematic structural diagram of a transmission device according to another embodiment of the present invention.

Referring to FIG. 11, the transmission device 10 further includes a sending unit 113, configured to send the second information determined by the processing unit 112.

Optionally, the information attribute includes one or more of a transmission layer, a priority, or a source. The transmission layer is used to indicate a quantity of times the corresponding information of the first information is forwarded before the corresponding information of the first information is forwarded to the transmission device. The priority is used to indicate a priority at which the corresponding information of the first information is processed. The source is used to indicate a source of the sending device sending the corresponding information of the first information.

Optionally, the source includes that the sending device is located inside a cell coverage area, or the sending device is located outside a cell coverage area.

Further, the first information is D2D data, and the second information is relay D2D data; and the processing unit 112 is specifically configured to determine the relay D2D data in at least one piece of D2D data according to an information attribute of each of the at least one piece of D2D data; or the first information is first D2D data scheduling assignment SA signaling, and the second information is relay D2D data; and the processing unit 112 is specifically configured to: determine second D2D data scheduling assignment SA signaling according to an information attribute of corresponding D2D data of each of at least one piece of first D2D data scheduling assignment SA signaling, and determine the relay D2D data according to the second D2D data scheduling assignment SA signaling; or the first information is a D2D discovery signal, and the second information is a relay D2D discovery signal; and the processing unit 112 is specifically configured to determine the relay D2D discovery signal in at least one D2D discovery signal according to an information attribute of each of the at least one D2D discovery signal.

Optionally, the processing unit 112 is specifically configured to obtain the information attribute of the corresponding information of each piece of first information according to a redundancy parity bit CRC of each of the at least one piece of first information. A mask of the CRC is used to indicate the information attribute.

Optionally, the first information includes at least two code segments.

The processing unit 112 is specifically configured to obtain masks of at least two CRCs according to CRCs of the at least two code segments. Each code segment corresponds to one CRC. The masks of the at least two CRCs are used to indicate the information attribute of the corresponding information of the first information.

Optionally, there is a preset Hamming distance between the masks of the CRCs. The mask of the CRC includes at least one of the following forms: 0000 0000 0000 0000 0000 0000, 1111 1111 1111 1111 1111 1111, 1010 1010 1010 1010 1010 1010, 0101 0101 0101 0101 0101 0101, 1100 1100 1100 1100 1100 1100, 0011 0011 0011 0011 0011 0011, 1111 0000 1111 0000 1111 0000, or 0000 1111 0000 1111 0000 1111.

Further, the processing unit 112 is further configured to update an information attribute of the second information.

It should be noted that the receiving unit 111 in this embodiment may be a receiver of the transmission device, and the sending unit 113 may be a transmitter of the transmission device. The processing unit 112 may be a separately disposed processor, or may be implemented by being integrated in a processor of the transmission device, and in addition, may be stored in a memory of the transmission device in a form of program code. A processor of the transmission device invokes and executes a function of the foregoing processing unit 112. The processor herein may be a central processing unit (English full name: Central Processing Unit, CPU for short) or an application-specific integrated circuit (English full name: Application Specific Integrated Circuit, ASIC for short), or may be one or more integrated circuits configured to implement this embodiment of the present invention.

Figure 12:
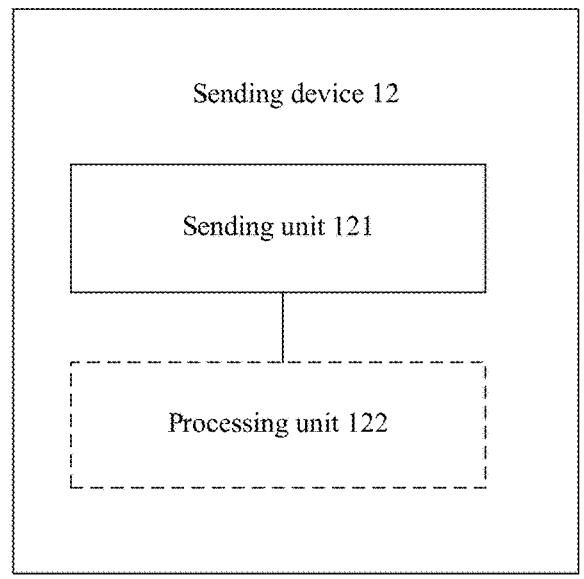
FIG. 12 is a schematic structural diagram of a sending device according to an embodiment of the present invention.

Referring to FIG. 12, a sending device 12 is provided, used for device to device proximity service D2D communication, and including:

a sending unit 121, configured to send first information, where the first information includes an information attribute of corresponding information of the first information, so that a transmission device receiving the first information determines second information according to the information attribute of the corresponding information of the first information.

The sending device provided in this embodiment of the present invention can configure an information attribute of corresponding information of sent first information in the first information, so that a transmission device can determine relayed second information according to the information attribute included in the received first information, and the transmission device used as relay UE can distinguish received information, so as to implement normal D2D communication.

Further, referring to FIG. 12, the sending device 12 further includes a processing unit 122, configured to configure the information attribute of the corresponding information of the first information in the first information sent by the sending unit 121. The information attribute includes one or more of a transmission layer, a priority, or a source. The transmission layer is used to indicate a quantity of times the corresponding information of the first information is forwarded before the corresponding information of the first information is forwarded to the transmission device. The priority is used to indicate a priority at which the corresponding information of the first information is processed. The source is used to indicate a source of the sending device sending the corresponding information of the first information.

Optionally, the first information includes one or more of D2D data, D2D data scheduling assignment SA signaling, or a D2D discovery signal.

Optionally, the source includes that the sending device is located inside a cell coverage area, or the sending device is located outside a cell coverage area.

Further, the processing unit 122 is specifically configured to configure a mask of a CRC for a CRC of the first information. The mask of the CRC is used to indicate the information attribute of the corresponding information of the first information.

Optionally, the first information includes at least two code segments. The first information includes at least two code segments.

The processing unit 122 is specifically configured to configure a mask of a CRC for each code segment of the first information. The masks of the at least two CRCs are used to indicate the information attribute of the corresponding information of the first information.

Optionally, there is a preset Hamming distance between the masks of the CRCs. With reference to the sixth possible implementation manner of the fourth aspect, in a seventh possible implementation manner, The mask of the CRC includes at least one of the following forms: 0000 0000 0000 0000 0000 0000, 1111 1111 1111 1111 1111 1111, 1010 1010 1010 1010 1010 1010, 0101 0101 0101 0101 0101 0101, 1100 1100 1100 1100 1100 1100, 0011 0011 0011 0011 0011 0011, 1111 0000 1111 0000 1111 0000, or 0000 1111 0000 1111 0000 1111.

It should be noted that the sending unit 121 in this embodiment may be a transmitter of the transmission device. The processing unit 122 may be a separately disposed processor, or may be implemented by being integrated in a processor of the transmission device, and in addition, may be stored in a memory of the transmission device in a form of program code. A processor of the transmission device invokes and executes a function of the foregoing processing unit 122. The processor herein may be a central processing unit (English full name: Central Processing Unit, CPU for short) or an application-specific integrated circuit (English full name: Application Specific Integrated Circuit, ASIC for short), or may be one or more integrated circuits configured to implement this embodiment of the present invention.

Figure 13:
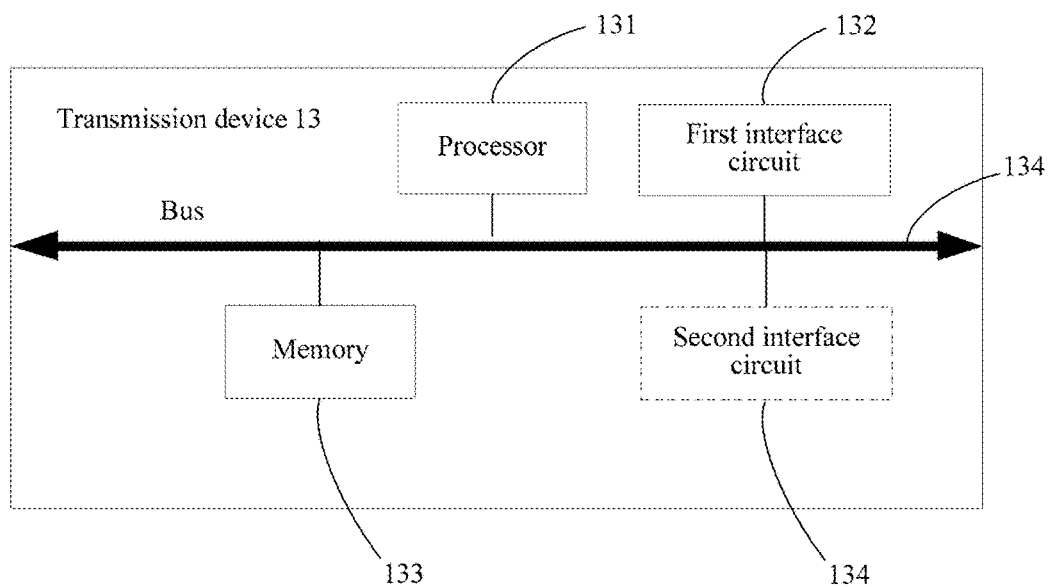
FIG. 13 is a schematic structural diagram of a transmission device according to still another embodiment of the present invention.

Referring to FIG. 13, a transmission device 13 is provided, used for device to device proximity service D2D communication, and including: a processor 131, a first interface circuit 132, a memory 133, and a bus 134. The processor 131, the first interface circuit 132, and the memory 133 are connected to each other and communicate with each other by using the bus 134.

It should be noted that the processor 131 herein may be one processor, or may be a general term of multiple processing elements. For example, the processor may be a central processing unit CPU, may be an application-specific integrated circuit ASIC, or may be one or more integrated circuits configured to implement this embodiment of the present invention, for example, one or more microprocessors (English full name: digital signal processor, DSP for short), or one or more field programmable gate arrays (English full name: Field Programmable Gate Array, FPGA for short).

The memory 133 may be one storage apparatus, or may be a general term of multiple storage elements, and is configured to store executable program code or a parameter, data, and the like that are needed in operation of an access network management device. The memory 133 may include a random-access memory (English full name: Random-Access Memory, RAM for short) or may include a non-volatile memory (English full name: non-volatile memory, NVRAM for short), such as a magnetic disk storage or a flash (Flash).

The bus 134 may be an Industry Standard Architecture (English full name: Industry Standard Architecture, ISA for short) bus, a Peripheral Component Interconnect (English full name: Peripheral Component, PCI for short) bus, an Extended Industry Standard Architecture (English full name: Extended Industry Standard Architecture, EISA for short) bus, or the like. The bus 134 may be classified into an address bus, a data bus, a control bus, and the like. For ease of representation, the bus 134 is represented in FIG. 13 by using only one bold line, but it does not indicate that there is only one bus or only one type of bus.

The first interface circuit 132 is configured to receive at least one piece of first information.

The processor 131 is configured to determine an information attribute of corresponding information of each of the at least one piece of first information received by the first interface circuit 132.

The processor 131 is further configured to determine second information according to the information attribute of the corresponding information of each of the at least one piece of first information.

The transmission device provided in this embodiment of the present invention can determine relayed second information according to an information attribute that is of corresponding information of received first information and that is included in the first information, so that relay UE can distinguish received information, so as to implement normal D2D communication.

Optionally, referring to FIG. 13, the transmission device 13 further includes a second interface circuit 135, configured to send the second information determined by the processor 131.

Optionally, the information attribute includes one or more of a transmission layer, a priority, or a source. The transmission layer is used to indicate a quantity of times the corresponding information of the first information is forwarded before the corresponding information of the first information is forwarded to the transmission device. The priority is used to indicate a priority at which the corresponding information of the first information is processed. The source is used to indicate a source of the sending device sending the corresponding information of the first information.

Optionally, the source includes that the sending device is located inside a cell coverage area, or the sending device is located outside a cell coverage area.

Further, the first information is D2D data, and the second information is relay D2D data.

The processor 131 is specifically configured to determine the relay D2D data in at least one piece of D2D data according to an information attribute of each of the at least one piece of D2D data; or the first information is first D2D data scheduling assignment SA signaling, and the second information is relay D2D data; and the processor 131 is specifically configured to: determine second D2D data scheduling assignment SA signaling according to an information attribute of corresponding D2D data of each of at least one piece of first D2D data scheduling assignment SA signaling, and determine the relay D2D data according to the second D2D data scheduling assignment SA signaling; or the first information is a D2D discovery signal, and the second information is a relay D2D discovery signal; and the processor 131 is specifically configured to determine the relay D2D discovery signal in at least one D2D discovery signal according to an information attribute of each of the at least one D2D discovery signal.

Further, optionally, the processor 131 is specifically configured to obtain the information attribute of the corresponding information of each piece of first information according to a redundancy parity bit CRC of each of the at least one piece of first information. A mask of the CRC is used to indicate the information attribute.

Optionally, the first information includes at least two code segments.

The processor 131 is specifically configured to obtain masks of at least two CRCs according to CRCs of the at least two code segments. Each code segment corresponds to one CRC. The masks of the at least two CRCs are used to indicate the information attribute of the corresponding information of the first information.

Optionally, there is a preset Hamming distance between the masks of the CRCs. The mask of the CRC includes at least one of the following forms: 0000 0000 0000 0000 0000 0000, 1111 1111 1111 1111 1111 1111, 1010 1010 1010 1010 1010 1010, 0101 0101 0101 0101 0101 0101, 1100 1100 1100 1100 1100 1100, 0011 0011 0011 0011 0011 0011, 1111 0000 1111 0000 1111 0000, or 0000 1111 0000 1111 0000 1111.

Further, the processor 131 is further configured to update an information attribute of the second information.

Figure 14:
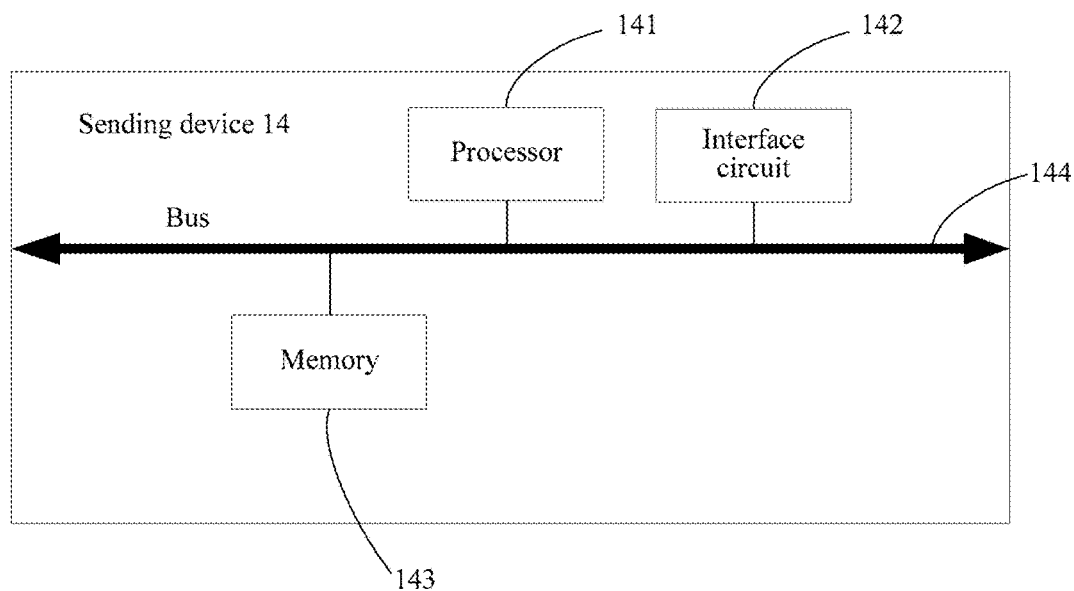
FIG. 14 is a schematic structural diagram of a sending device according to another embodiment of the present invention.

Referring to FIG. 14, a sending device 14 is provided, used for device to device proximity service D2D communication, and including: a processor 141, an interface circuit 142, a memory 143, and a bus 144. The processor 141, the interface circuit 142, and the memory 143 are connected to each other and communicate with each other by using the bus 144.

It should be noted that the processor 141 herein may be one processor, or may be a general term of multiple processing elements. For example, the processor may be a central processing unit CPU, may be an application-specific integrated circuit ASIC, or may be one or more integrated circuits configured to implement this embodiment of the present invention, for example, one or more microprocessors (English full name: digital signal processor, DSP for short), or one or more field programmable gate arrays (English full name: Field Programmable Gate Array, FPGA for short).

The memory 143 may be one storage apparatus, or may be a general term of multiple storage elements, and is configured to store executable program code or a parameter, data, and the like that are needed in operation of an access network management device. The memory 143 may include a random-access memory (English full name: Random-Access Memory, RAM for short) or may include a non-volatile memory (English full name: non-volatile memory, NVRAM for short), such as a magnetic disk storage or a flash (Flash).

The bus 144 may be an Industry Standard Architecture (English full name: Industry Standard Architecture, ISA for short) bus, a Peripheral Component Interconnect (English full name: Peripheral Component, PCI for short) bus, an Extended Industry Standard Architecture (English full name: Extended Industry Standard Architecture, EISA for short) bus, or the like. The bus 144 may be classified into an address bus, a data bus, a control bus, and the like. For ease of representation, the bus 144 is represented in FIG. 14 by using only one bold line, but it does not indicate that there is only one bus or only one type of bus.

The interface circuit 142 is configured to send first information. The first information includes an information attribute of corresponding information of the first information, so that a transmission device receiving the first information determines second information according to the information attribute of the corresponding information of the first information.

The sending device provided in this embodiment of the present invention can configure an information attribute of corresponding information of sent first information in the first information, so that a transmission device can determine relayed second information according to the information attribute included in the received first information, and the transmission device used as relay UE can distinguish received information, so as to implement normal D2D communication.

Further, referring to FIG. 14, the processor 141 is configured to configure the information attribute of the corresponding information of the first information in the first information sent by the interface circuit 142. The information attribute includes one or more of a transmission layer, a priority, or a source. The transmission layer is used to indicate a quantity of times the corresponding information of the first information is forwarded before the corresponding information of the first information is forwarded to the transmission device. The priority is used to indicate a priority at which the corresponding information of the first information is processed. The source is used to indicate a source of the sending device sending the corresponding information of the first information.

Optionally, the first information includes one or more of D2D data, D2D data scheduling assignment SA signaling, or a D2D discovery signal.

Optionally, the source includes that the sending device is located inside a cell coverage area, or the sending device is located outside a cell coverage area.

Further, the processor 141 is specifically configured to configure a mask of a CRC for a CRC of the first information. The mask of the CRC is used to indicate the information attribute of the corresponding information of the first information.

Optionally, the first information includes at least two code segments.

The processor 141 is specifically configured to configure a mask of a CRC for each code segment of the first information. The masks of the at least two CRCs are used to indicate the information attribute of the corresponding information of the first information.

Optionally, there is a preset Hamming distance between the masks of the CRCs. The mask of the CRC includes at least one of the following forms: 0000 0000 0000 0000 0000 0000, 1111 1111 1111 1111 1111 1111, 1010 1010 1010 1010 1010 1010, 0101 0101 0101 0101 0101 0101, 1100 1100 1100 1100 1100 1100, 0011 0011 0011 0011 0011 0011, 1111 0000 1111 0000 1111 0000, or 0000 1111 0000 1111 0000 1111.

In addition, a computer readable medium (or medium) is further provided, including a computer readable instruction performing the following operations when the computer readable instruction is being executed: performing operations of 101 to 104, 201 to 204, 301 to 304, 401 to 405, or 501 to 506, or 600 to 601 of the method in the foregoing embodiments.

In addition, a computer program product is further provided, including the foregoing computer readable medium.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM for short, English full name: Read-Only Memory), a random access memory (RAM for short, English full name: Random Access Memory), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A transmission device for use in device to device proximity service D2D communication, the transmission device comprising:
   a processor, a first interface circuit, a memory, and a bus, wherein the processor, the first interface circuit, and the memory are connected to each other and communicate with each other by using the bus;
   wherein the first interface circuit is configured to receive at least one piece of first information; and
   wherein the processor is configured to:
      determine an information attribute of corresponding information of each of the at least one piece of first information received by the first interface circuit, wherein the information attribute comprises one or more of:
         a transmission layer for indicating a quantity of times the corresponding information of the first information is forwarded before the corresponding information of the first information is forwarded to the transmission device,
         a priority for indicating a priority at which the corresponding information of the first information is processed, and
         a source for indicating a source of a sending device sending the corresponding information of the first information, and
      determine second information according to the information attribute of the corresponding information of each of the at least one piece of first information.

2. The transmission device according to claim 1, further comprising a second interface circuit, configured to send the second information.

3. The transmission device according to claim 1, wherein the source indicates the sending device is located inside a cell coverage area, or the sending device is located outside a cell coverage area.

4. The transmission device according to claim 1, wherein:
   the first information is D2D data, the second information is relay D2D data and the processor is configured to determine the relay D2D data in at least one piece of D2D data according to an information attribute of each of the at least one piece of D2D data; or
   the first information is first D2D data scheduling assignment SA signaling, the second information is relay D2D data and the processor is configured to: determine second D2D data scheduling assignment SA signaling according to an information attribute of corresponding D2D data of each of at least one piece of first D2D data scheduling assignment SA signaling, and determine the relay D2D data according to the second D2D data scheduling assignment SA signaling; or
   the first information is a D2D discovery signal, the second information is a relay D2D discovery signal and the processor is configured to determine the relay D2D discovery signal in at least one D2D discovery signal according to an information attribute of each of the at least one D2D discovery signal.

5. The transmission device according to claim 1, wherein the processor is configured to obtain the information attribute of the corresponding information of each piece of first information according to a redundancy parity bit CRC of each of the at least one piece of first information, wherein a mask of the CRC is used to indicate the information attribute.

6. The transmission device according to claim 5, wherein:
   the first information comprises at least two code segments; and
   the processor is configured to obtain masks of at least two CRCs according to CRCs of the at least two code segments, wherein each code segment corresponds to one CRC, and the masks of the at least two CRCs for indicating the information attribute of the corresponding information of the first information.

7. A transmission device for use in device to device proximity service D2D communication, the transmission device comprising:
   a processor, a first interface circuit, a memory, and a bus, wherein the processor, the first interface circuit, and the memory are connected to each other and communicate with each other by using the bus;
   wherein the first interface circuit is configured to receive at least one piece of first information; and
   wherein the processor is configured to:
      determine an information attribute of corresponding information of each of the at least one piece of first information received by the first interface circuit,
      determine second information according to the information attribute of the corresponding information of each of the at least one piece of first information, and
      obtain the information attribute of the corresponding information of each piece of first information according to a redundancy parity bit CRC of each of the at least one piece of first information, wherein a mask of the CRC is used to indicate the information attribute;
   wherein there is a preset Hamming distance between masks of CRCs.

8. The transmission device according to claim 7, wherein the masks of the CRCs comprise at least one of the following forms: 0000 0000 0000 0000 0000 0000, 1111 1111 1111 1111 1111 1111, 1010 1010 1010 1010 1010 1010, 0101 0101 0101 0101 0101 0101, 1100 1100 1100 1100 1100 1100, 0011 0011 0011 0011 0011 0011, 1111 0000 1111 0000 1111 0000, or 0000 1111 0000 1111 0000 1111.

9. The transmission device according to claim 2, wherein the processor is further configured to update an information attribute of the second information.

10. A sending device for use in device to device proximity service D2D communication, the sending device comprising:
    a processor, an interface circuit, a memory, and a bus, wherein the processor, the interface circuit, and the memory are connected to each other and communicate with each other by using the bus;
    wherein the interface circuit is configured to send first information comprising an information attribute of corresponding information of the first information to a transmission device for determining second information according to the information attribute of the corresponding information of the first information; and
    wherein the processor is configured to configure the information attribute of the corresponding information of the first information in the first information sent by the interface circuit, wherein the information attribute comprises one or more of:
       a transmission for indicating a quantity of times the corresponding information of the first information is forwarded before the corresponding information of the first information is forwarded to the transmission device, a priority for indicating a priority at which the corresponding information of the first information is processed, and a source for indicating a source of the sending device sending the corresponding information of the first information.

11. The sending device according to claim 10, wherein the first information comprises one or more of D2D data, D2D data scheduling assignment SA signaling, or a D2D discovery signal.

12. The sending device according to claim 11, wherein the source indicates the sending device is located inside a cell coverage area, or the sending device is located outside a cell coverage area.

13. The sending device according to claim 10, wherein the processor is configured to configure a mask of a CRC for a CRC of the first information for indicating the information attribute of the corresponding information of the first information.

14. The sending device according to claim 13, wherein the first information comprises at least two code segments and the processor is configured to configure a mask of a CRC for each code segment of the first information for indicating the information attribute of the corresponding information of the first information.

15. The sending device according to claim 13, wherein there is a preset Hamming distance between masks of CRCs.

16. The sending device according to claim 15, wherein the masks of the CRCs comprise at least one of the following forms: 0000 0000 0000 0000 0000 0000, 1111 1111 1111 1111 1111 1111, 1010 1010 1010 1010 1010 1010, 0101 0101 0101 0101 0101 0101, 1100 1100 1100 1100 1100 1100, 0011 0011 0011 0011 0011 0011, 1111 0000 1111 0000 1111 0000, or 0000 1111 0000 1111 0000 1111.

* * * * *